Dec. 11, 1951 W. S. YORK 2,578,622
NET ROLLER FOR FISHING BOATS
Filed Aug. 27, 1948 2 SHEETS—SHEET 2
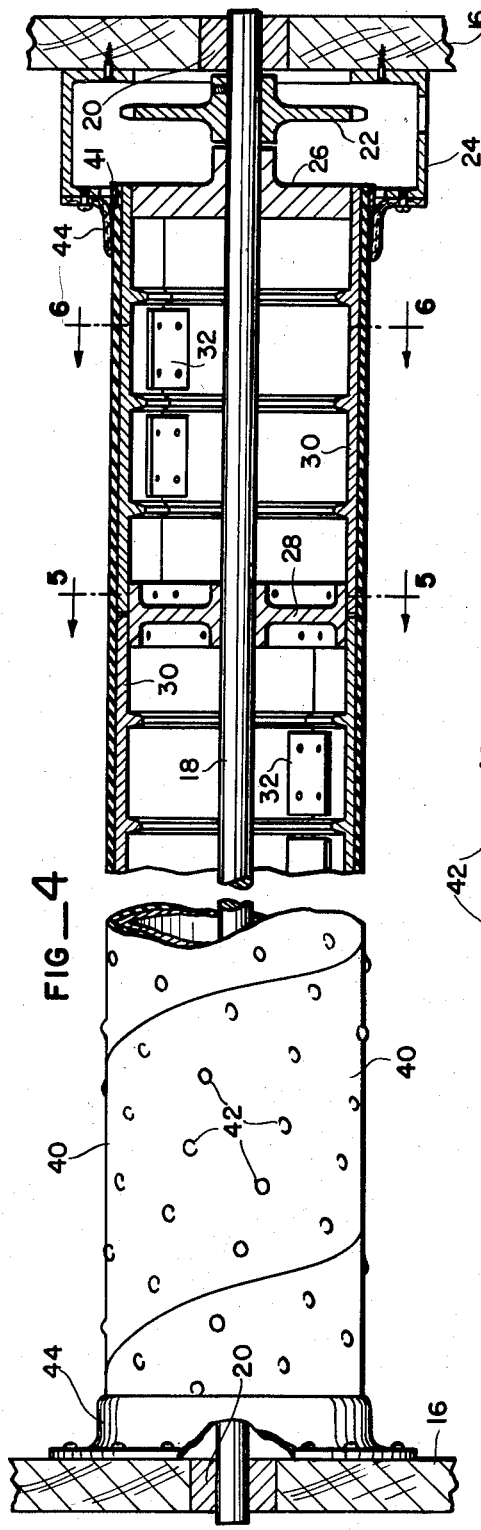
FIG_4
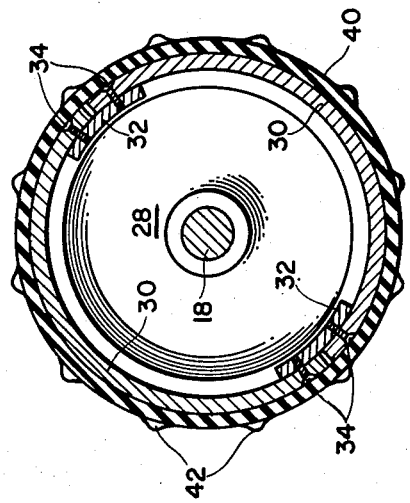
FIG_6
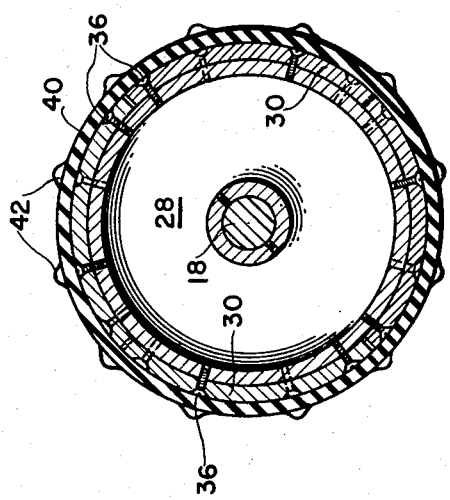
FIG_5
WILLIAM S. YORK
Inventor
By Smith & Tuck
Attorneys Patented Dec. 11, 1951

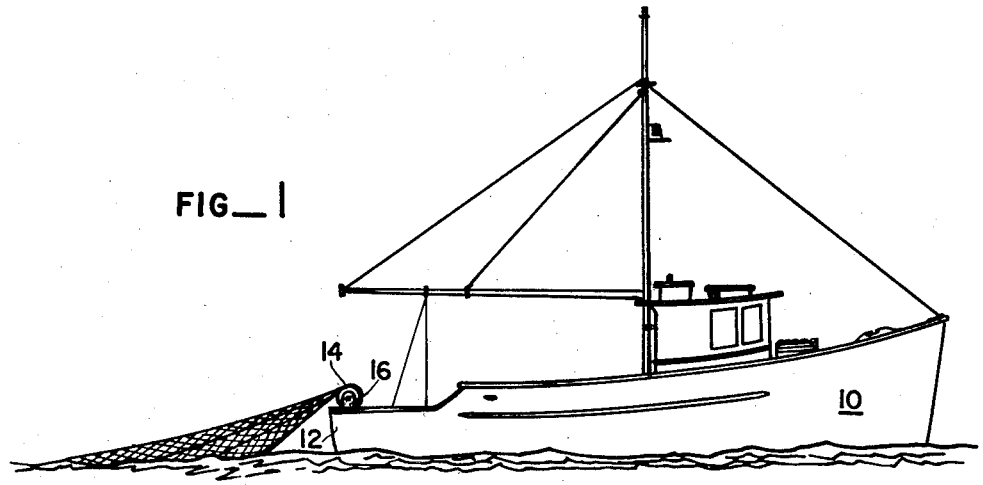
FIG_1
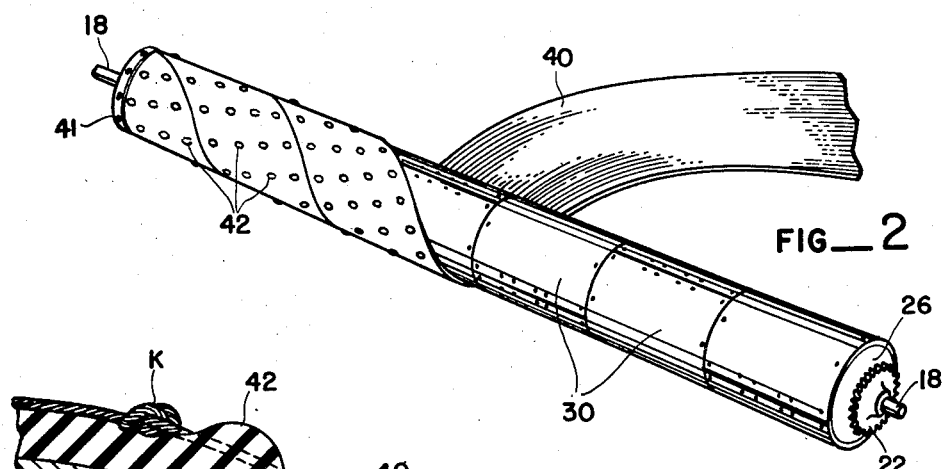
FIG_2
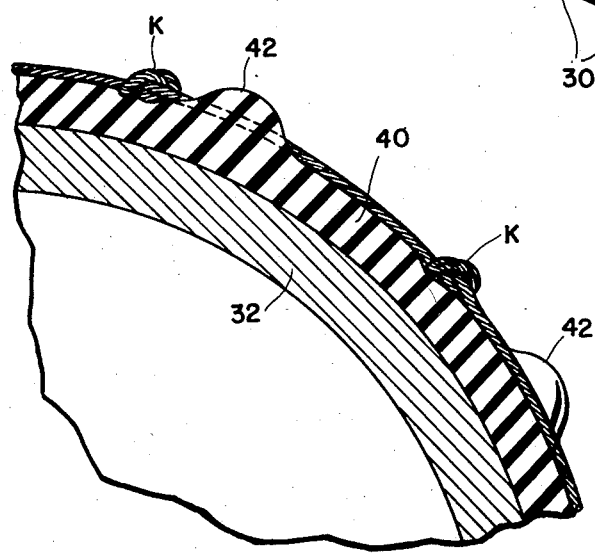
FIG_3
WILLIAM S. YORK
Inventor

2,578,622

UNITED STATES PATENT OFFICE 2,578,622

NET ROLLER FOR FISHING BOATS

William S. York, Bellingham, Wash., assignor to Northern Marine Corporation, Bellingham, Wash., a corporation of Washington Application August 27, 1948, Serial No. 46,530

2 Claims. (Cl. 254—138)

This invention relates to a net roller for fishing boats and, more particularly, is the provision of improvements in the methods of constructing such rollers to facilitate their manufacture and to make them more useful in fishing operations.

Rollers constructed of wooden bars with rough wooden slatted surfaces or with rope-strips thereon have been used in the past in the purse-seining branch of deep sea fishing to aid the fisherman in paying out the nets and, more often, in bringing the nets into the boats. Such rollers are usually mounted at or near the stern of the vessel and they act to reduce the friction of the net as it passes over the vessel's rail. The rollers known in the art are, however, unduly hard on the nets and cause them to be torn or ripped or otherwise damaged. It is such defects and disadvantages as these that it is an important object of this invention to overcome.

Other and equally important objects of this invention reside in the provision in a net roller of (a) a construction that is simple and easy to produce and which has a long and durable existence under conditions of extremely hard usage; (b) a surface conformation for the roller that both facilitates the engagement of the net during a rolling-in movement and insures the minimum of injurious strains and contacts between the net and the rollers; (c) a sectionalized construction for rollers that permit within relatively broad limits the adaption of the invention to a wide variety of needs as to the length of the rollers; (d) a method of covering and a covering for rollers that is both resilient in use and inexpensive in first cost and installation as compared with conventional methods of resiliently sleeving rollers; and (e) a roller which will receive and be engaged by protuberances of the nets to insure that the roller carries the net and its contents with but a minimum of attention from the fisherman handling the net. Other and further objects and advantages of the invention will be more apparent during the course of the following description when taken in view of the accompanying drawings, in which:

Fig. 1 is a view illustrating a fishing boat equipped with a roller according to my invention;

Fig. 2 is a perspective view of the roller with its covering partially applied and illustrating the manner of covering the roller;

Fig. 3 is an enlarged fragmentary cross-sectional view of a portion of the roller illustrating the manner in which a net is received and engaged to the roller;

Fig. 4 is an enlarged view of the roller with a portion shown in section for convenience of illustrating internal construction features; and Fig. 5 and Fig. 6 are cross-sectional views taken in the planes indicated by lines 5—5 and 6—6 respectively of Fig. 4.

Refering to Fig. 1 wherein is shown a boat 10 having at its stern 12 a roller 14 mounted at its ends in standards 16 which form and support the journals for the longitudinally extending shaft 18, shown in greater detail in Fig. 4. To eliminate wear and the like, bushings 20 have ben inserted in the standards 16. At one end shaft 18 has a drive sprocket 22 secured thereto and power is applied from either the boat's drive shaft or auxiliary power means in the conventional manner, usually by a sprocket chain.

A housing 24 encloses the sprocket 22 and precludes the net or other gear from becoming entangled with the drive means or other rotary elements.

I provide wheel-like or annular support means such as the end bells 26 and the intermediate spacers 28 that are secured to and rotate with the shaft 18 and which support the case forming the roller. The case is preferably formed of metallic casing segments 30 that are semi-cylindrical, hollow and usually have internal arcuate ribs to provide internal strenghtening. The casing segments 30 are mounted about the shaft in pairs since, normally, several pairs are required to form a roller long enough for the usual needs. These segments in pairs are mounted in edge abutting relation and the opposed edges of a single pair are secured together by a spanner plate 32, as shown in Figs. 4 and 6, which are engaged by flat-headed screws 34.

In similar manner the ends of the casing segments are joined to either the end bells 26 or the intermediate supports 28 thru the instrumentality of screws 36. It should be particularly noted that the pairs of segments are mounted so that one pair may lie with their seams or abutting edges in one plane and the next pair lie with seams or abutting edges in a plane at 90° to the plane of the first pair. In those cases where a third pair is used, the segments will again lie so their edges are in a plane at ninety degrees to the second pair and similar to the first pair of casing segments. This arrangement facilitates assembly and also distributes the strains applied to the roller more evenly around the shaft and throughout the fastenings used such, for example, as the screws 34 and 36.

The roller is covered by a resilient sheathing formed, preferably, of rubber which is tightly and closely applied to the surface of the roller and there held by adhesive material. I prefer to use a strip 40 of rubber which strip has a width less than the diameter of the roller and a length greater than that of the roller. By starting the covering strip at one end and wrapping the same around the roller in a spiral fashion, as shown in Fig. 2, the covering is tightly applied and will withstand extremely hard usage. Usually the roller is coated with an adhesive mastic and the inner face of the covering strip is likewise coated with the same or a similar adhesive material. When the strip is wrapped around the roller the two adhesive surfaces come into contact and joint to form a strong bond between the rubber and the roller's metallic surface. In use the covering strip by means of the spiral wrapping around the roller distributes severe but localized forces over a wide area and does not tend to strip off the roller as would be the case with a covering that has a longitudinally extending seam along one side as when a single sheet of a size coextensive to the surface of the roller is applied with the edges in abutting relation.

The outer face of the rubber covering strip 40 is provided with knobs or protuberances 42 which are arranged in a patterned arrangement over the material in spaced-apart relation. These elements 42 will engage in the meshes of a net and tend to drag it along with the roller as power is applied to turn it when the net is coming into the boat. In addition it has been found desirable to employ a rubber material that has a resiliency such that the knots K of the mesh or net will bite into and thus more or less frictionally adhere to the roller. The combination of the knobs and the knots depressing the rubber insures that a fisherman tending an incoming net need do little more than insure that a reasonable portion of the roller surface is contacted by the next and the roller will do the rest. When the net is payed, and power is then not usually applied to the roller, the attendant need only keep enough pull on the net to insure contact as the net goes over the side and the roller will freely turn.

To prevent the net from getting around the end of the roller and from coming into contact with the roller shaft 18, I use non-rotary bell-like shields or cuffs 44, shown in Fig. 4, that tend to deflect the net away from the ends of the roller and its supports. These elements are preferably best attached to the supports or standards 16 and the sprocket casing 24.

Any tendency of the resilient sheathing 40 to peel or strip off the ends of roller 30 is prevented by a metal band or hoop 41. This band is preferably formed of brass or non-corrosive material which encircles the sheating at each end of the roller and is suitably secured by screws or the like, or, in the case of a hoop, pressed into place to firmly compress and secure the exposed edges of the sheathing and thereby form a tight bond with the drum.

It will be apparent to those skilled in the art that changes and alterations can be made without departing from the spirit and scope of my invention as set forth in the appended claims.

Having thus described my invention, I claim:

1. A net retrieving roller for fishing boats, comprising: a shaft to be driven, means for driving said shaft, annular support means carried by said shaft in spaced apart relation therealong, hollow semi-cylindrical rigid casing elements mounted on said support means in pairs to form a cylindrical element about said shaft, said casing elements in adjacent pairs being secured to said support means in 90° phase to each other to distribute throughout the securing means and supports the forces applied to said roller during normal use, and a resilient rubber sheathing for said element to receive and support and engage the net in its passage over the roller.

2. A net retrieving roller for fishing boats, comprising: a shaft to be driven, means for driving said shaft, annular support means carried by said shaft in spaced apart relation longitudinally therealong, semi-cylindrical casing segments mounted on said support means in pairs to form a cylindrical element, adjacent pairs of said semi-cylindrical casing segments being secured in 90° phase to each other to distribute throughout the fastening means the forces applied to said roller during use, and a rubber sheathing adhesively applied to said roller and encasing the same, said sheathing having protuberances outstanding therefrom and distributed thereover in spaced apart relation to engage the meshes of a fishing net, said rubber sheathing being formed of a strip of rubber of greater length than said drum and of a width less than the diameter thereof and wrapped spirally thereabout, said rubber being of a softness that the knots of the meshed fishing net will normally depress the sheathing and tend to move therewith.

WILLIAM S. YORK.

REFERENCES CITED

The following references are of record in the file of this patent:

UNITED STATES PATENTS

| Number | Name | Date |
| --- | --- | --- |
| 981,918 | Davidson | Jan. 17, 1911 |
| 1,689,016 | Erlewine | Oct. 23, 1928 |
| 2,286,276 | Huddle | June 16, 1942 |
| 2,438,296 | Nassimbene | Mar. 23, 1948 |